(No Model.)
J. McDONALD.
WASHING MACHINE.
No. 461,505. Patented Oct. 20, 1891.
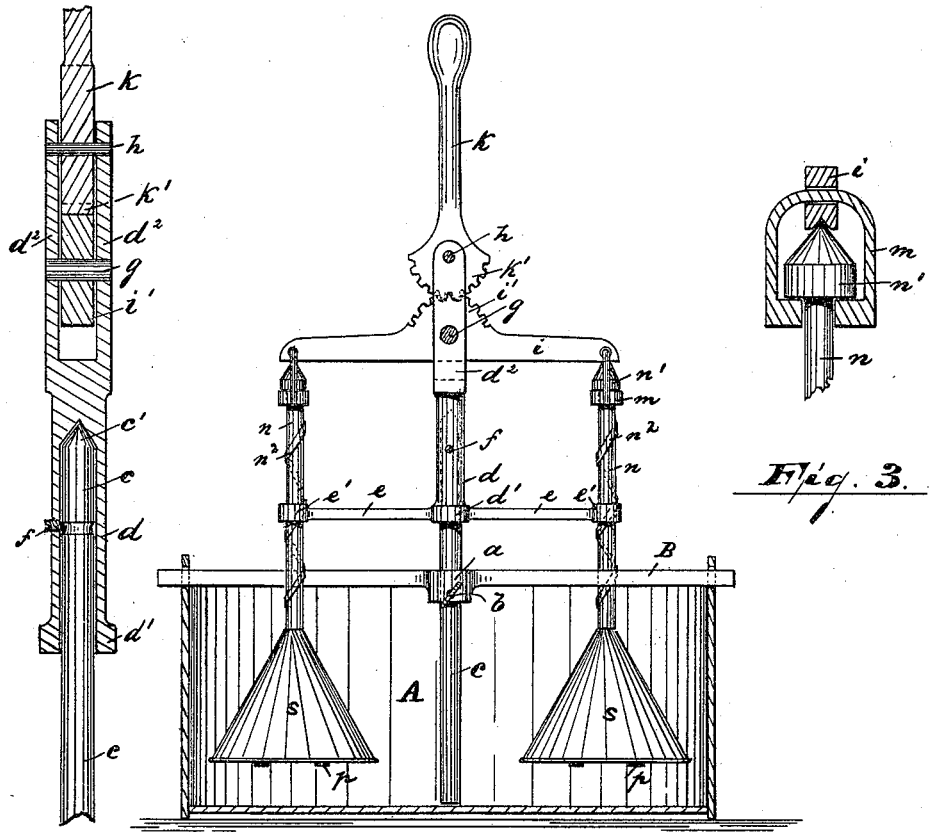
Fig. 1.
Fig. 3.
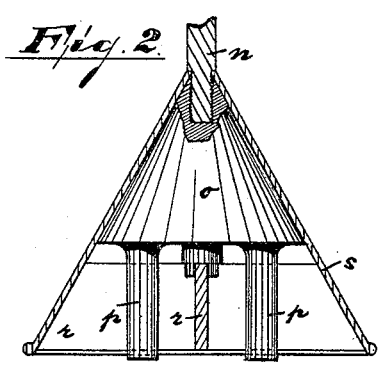
Fig. 2.
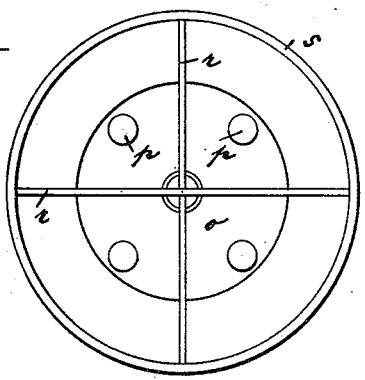
Fig. 4.
Fig. 5.
WITNESSES:
Wm. D. Bell
E. L. Sherman
INVENTOR
Joseph McDonald
BY Gartner & Co.
ATTORNEYS

UNITED STATES PATENT OFFICE.

JOSEPH McDONALD, OF HARRISON, NEW JERSEY.

WASHING-MACHINE.

SPECIFICATION forming part of Letters Patent No. 461,505, dated October 20, 1891.

Application filed March 25, 1891. Serial No. 386,389. (No model.)

*To all whom it may concern:*

Be it known that I, JOSEPH MCDONALD, a citizen of the United States, residing at Harrison, county of Hudson, and State of New Jersey, have invented certain new and useful Improvements in Washing-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a simple and reliable washing-machine readily attached to any wash-tub or receptacle and easily operated.

The invention consists in the improved washing-machine and the arrangement and combination of the various parts thereof, substantially as hereinafter more fully described, and finally embodied in the claims.

Referring to the accompanying drawings, in which like letters of reference indicate corresponding parts in each of the several views, Figure 1 is a side elevation of my improved washing-machine as attached to a wash-tub. Fig. 2 is an enlarged central vertical section of a portion of the supporting and driving mechanism. Fig. 3 is an enlarged vertical end section showing the mode of securing the plunger-rods to the cross-beam. Fig. 4 is an enlarged central vertical section of a plunger or washer, and Fig. 5 is a view of the under side of Fig. 4.

In said drawings, A represents an ordinary wash-tub, in the handles of which rests or is secured in any desired manner a cross-bar B. This cross-bar has an enlarged slotted central portion $a$, with tightening-screw $b$ for securing in any desired position a vertical supporting-rod $c$, the upper end of said rod being rounded or cone-shaped, as shown at $c'$, Fig. 2. Upon the upper portion of the rod $c$ is arranged and adapted to reciprocate vertically the hollow lower portion of a supporting-rod $d$, with enlarged bottom portion, as shown at $d'$, from which extend oppositely-arranged arms $e\ e$, provided with enlarged slotted ends $e'\ e'$. This hollow rod $d$ is pivotally secured to the rod $c$ by a pin $f$, working in an annular recess in rod $c$, as shown in Fig. 2, and has an upwardly-extending socket to receive and rest upon the upper end $e'$ of the shaft $c'$, as shown in Fig. 2. The upper portion of the rod $d$ is forked, as shown at $d^2$, in which are arranged and secured pins $g$ and $h$. On the pin $g$ is arranged and adapted to oscillate or vibrate an arm $i$, the central upper portion of said arm being enlarged and provided on its upper surface with cog-teeth $i'$ concentric with the pin $g$, as shown in Fig. 1. Upon the upper pin $h$ in the fork $d^2$ is arranged to oscillate or vibrate a hand operating-lever $k$, with enlarged lower portion, provided on its outer surface with cog-teeth $k'$, concentric with the pin $h$, and adapted to mesh into the teeth $i'$, as clearly shown in Fig. 1.

To the outer ends of the arm $i$ are pivoted swivels $m\ m$, socketed in their lower portions to receive the upper portions of vertical plunger-rods $n\ n$, the outer ends of rods being provided with shoulders $n'\ n'$ within said swivels to hold them therein and at the same time permit them to be turned in said swivel. The upper portions of said shoulders $n'$ are preferably pointed, as shown in Fig. 3, to allow them to rest in corresponding recesses in the lower portions of the arm $i$ to maintain them in proper position, although this may be dispensed with.

The plunger-rods $n\ n$ are alternately arranged in front of and behind the bar B to allow free action to the machine, and are provided with spiral threads $n^2$, adapted and arranged to move in corresponding spiral grooves in the inside of the holes in the ends $i'$ of the arms $e$. The lower ends of the rods $n$ are threaded to receive the threaded sockets of the small upper ends of wooden cones $o\ o$. These cones are covered with metallic plates $s$, extending down and beyond the base of the cones, forming a hollow extension below the wooden cone. This metallic-cone extension is braced across the bottom by cross-rods, as shown in Fig. 5, and to these cross-rods are secured wooden division-plates $r$, extending upward and connecting with the bottom of the wooden cone $o$. Within the chambers formed by the division-plates are arranged vertical wooden plungers or wash-rubbers $p$, firmly secured to the base of the wooden cone $o$ and extending a little below the metallic portion $s$, as shown in Fig. 4.

In operation the bar B is first placed or secured on the wash-tub or receptacle and the rod $c$, supporting and carrying all the washing mechanism, is inserted in the central hole in the bar B and then adjusted by means of the tightening-screw $b$ to the proper position of the plungers or washers on the clothes or material in the tub. The hand-lever is then moved back and forward, causing the plunger-rods with the plungers to reciprocate alternately and at the same time be rotated or turned by means of the spirals on the plunger-rods. By this operation the material in the tub is not only pounded, but by the turning of the plungers is also rubbed, and the water in the tub is kept in continual circulation by being forced upward by the plungers between the plates or divisions of the cones. The material is thus pounded and rubbed similar to hand-washing, and the air contained in the cones is continually forced down and through the clothes or material, thus freeing the dirt therefrom.

Having thus described my invention, what I claim as new, and desire to secure by Letters Patent, is—

1. In a washing-machine, a cross-bar, a vertical upright supported thereby, a pair of arms extending from said upright and provided at their ends with spirally-threaded perforations, a vibrating arm pivoted in the bifurcated upper end of the upright, means for vibrating said arm, rods pivotally attached to the ends of the said arm, said rods being spirally-threaded and passing through the spirally-perforated ends of the pair of arms, and plungers attached to the ends of the rods, all combined substantially as shown and described.

2. In a washing-machine, the combination, with a wash-tub, of a bar secured to or resting in said tub, a rod adjustably secured to said bar, a hollow rod pivotally secured to said first-mentioned rod and adapted to turn thereon, a vibrating arm pivotally secured to said hollow rod and provided with plungers or arms, and a vibrating lever provided at its lower end with gear-teeth adapted to mesh in gear-teeth on said vibrating arm, all said parts being arranged and adapted to operate said vibrating arm, substantially as described and set forth.

In testimony that I claim the foregoing I have hereunto set my hand this 29th day of January, 1891.

JOSEPH McDONALD.

Witnesses:
ALFRED GARTNER,
E. L. SHERMAN.